Patented Sept. 25, 1951

2,569,418

UNITED STATES PATENT OFFICE 2,569,418

3-AZO DERIVATIVES OF 1-SUBSTITUTED 2,5-DIKETO-7-METHYLPYRIMIDOPYRA-ZOLES

Henry B. Kellog, Weehawken, N. J., assignor to General Aniline & Film Corporation, New York, N. Y., a corporation of Delaware No Drawing. Application July 9, 1948, Serial No. 37,974

6 Claims. (Cl. 260—154)

The present invention relates to 3-azo derivatives of 1-substituted-2,5-diketo-7-methylpyrimidopyrazoles wherein the radical joined to said pyrimidopyrazoles by the azo group is the residue of a diazotizable amine of the aromatic or heterocyclic series.

It is an object of the present invention to provide 3-azo derivatives of 1-substituted-2,5-diketo-7-methylpyrimidopyrazoles useful as filter and anti-halation dyes in photographic film and as color formers in producing dye images by color forming development.

Other objects will be apparent from the following specification in which the preferred details and embodiments are described.

The azo compounds of this invention are characterized by a structure corresponding to the general formula:

wherein R is alkyl, e. g., methyl, ethyl, propyl, butyl, octyl, decyl, dodecyl, myristyl, tetradecyl, stearyl, octadecyl, etc.; aryl, e. g., phenyl, naphthyl, diphenyl and the like; aralkyl, e. g., benzyl, methylbenzyl, ethylbenzyl and the like; heterocyclic, e. g., benzothiazolyl, α-quinolyl, α-pyridyl and the like; $R_1$ represents a substituted or unsubstituted aryl group of the benzene, naphthalene, anthracene, and phenanthrene series; or a heterocyclic group, e. g., pyrrole, pyrazole, pyrazolone, carbazole, primuline, etc., with or without water-solubilizing groups such as sulfonic acid or carboxylic acid groups; and $n$ represents 1 or 2. Said alkyl, aryl, aralkyl, and heterocyclic groups designated by the value R may be substituted by a halogen such as chlorine, bromine, or iodine, amino groups, e. g., primary amino, secondary amino, such as methylamine, phenylamine, and the like, or a tertiary amine, such as dimethylamine, diphenylamine, etc., sulfonamino, or solublizing groups such as sulfonic or carboxylic acid groups.

The azo compounds illustrated by the foregoing general formula are obtained by coupling any diazotized amine of the type common in azo dye chemistry, with a 1-substituted-2,5-diketo-7-methylpyrimidopyrazole of the general formula:

wherein R is of the same value as above.

The 1-substituted-2,5-diketo-7-methylpyrimidopyrazoles characterized by the foregoing formula are prepared according to the method described in application Serial No. 563,974, filed on November 17, 1944, now United States Patent 2,481,466, issued September 6, 1949. In general, the method consists of heating 1 mol of a 3-amino-5-pyrazolone, the 1-position of which is substituted by a radical represented by R above, with 1 to 1½ mols of diketene in the presence of a solvent-diluent, such as, for example, an aromatic hydrocarbon, or an oxygenated hydrocarbon, i. e., an ether, ketone, or alcohol, at a temperature ranging from 80° C. to 130° C. from 2 to 5 hours. Instead of employing a solvent-diluent for the reaction, the reactants may be suspended in water and the aqueous suspension heated at a temperature ranging from 80° C. to 100° C. for the same period of time.

In preparing the azo derivatives, the above 1-substituted-2,5-diketo-7-methylpyrimidopyrazoles are coupled with a diazonium salt in the usual manner. Any primary aromatic or heterocyclic amine capable of undergoing the diazotization reaction may be employed in the preparation of the diazonium salt. As examples of illustrative amines, the following may be mentioned:

Aniline
p-Chloroaniline
2,5-dichloroaniline
p-Hydroxyaniline
α-Naphthylamine
p-Nitroaniline
o-Nitroaniline
3-nitro-4-toluidine
2-nitro-4-chloroaniline
2,4-dinitroaniline
Sulfanilic acid
1-amino-2-naphthol sulfonic acid
p-Aminodiphenylamine
Benzidine 4,4'-diaminostilbene
1-naphthylamine-6-sulfonic acid
1-(phenyl-4'-sulfo)-3-methyl-4-amino-5-pyrazolone
α-Naphthylamine
Aniline-2,5-disulfonic acid
1-naphthylamine-7-sulfonic acid
2-chloro-4-aminobenzoic acid
Benzidine-2,2'-disulfonic acid
2-amino-4-sulfobenzoic acid
Primuline
2,6-diaminotoluene-4-sulfonic acid
3-aminobenzoic acid
2-amino-8-naphthol-3,6-disulfonic acid
1,4-diaminonaphthalene-3-sulfonic acid
Dianisidine
Tolidine
Di-tolidine
p-Aminobenzyldiethylamine
p-Acetaminoaniline
Anthranilic acid
2-ethoxybenzidine
o,o'-Diaminodiphenic acid
2,2'-diaminocarbazol
3,3'-dichlorobenzidine
2-nitrobenzidine
4,4'-diaminostilbene-2,2'-disulfonic acid
4,4'-diamino-2,2'-tetramethyltriphenylmethane
2-aminobenzothiazole
2-amino-6-ethoxybenzothiazole
2-aminobenzoxazole
4-amino-5-pyrazolone
1-phenyl-3-anilino-4-amino-5-pyrazolone
1-phenyl-3-amino-5-pyrazolone
4,4'-diaminodiphenylurea-3,3'-disulfonic acid
4,4'-diaminodiphenylmethane
2-(4'-phenylamino)-6-methylbenzothiazole
4-aminoperimidine-5,8-disulfonic acid.

The azo compounds, in view of their keto-methylene configuration, may have the structure of a hydrazone or some other tautomeric form or a mixture of these as indicated by the following partial structures:

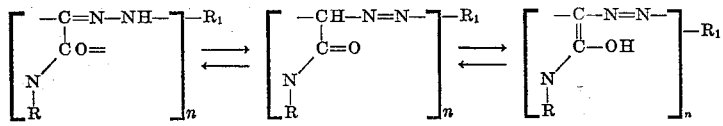

It is to be understood that I intend to include within the scope of my invention any of these modifications or forms in which the azo compounds of the present invention may exist. It is to be further noted that regardless of the form in which they may exist, their utility as filter and anti-halation dyes and as color formers for producing dye images by color forming development is not diminished or impaired.

The following examples illustrate the preparation of the azo compounds of the present invention.

EXAMPLE I 1-phenyl-2,5-diketo-3-(o-methoxyphenylazo)-7-methylpyrimidopyrazole

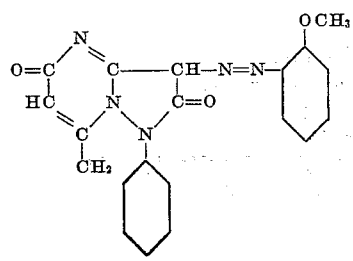

A mixture of 0.6 gram of o-anisidine, 10 cc. of water, 20 grams of ice, and 5 cc. of hydrochloric acid (6 N) was diazotized with a solution of 0.4 gram of sodium nitrite in 5 cc. of water. The resulting o-anisidine diazonium chloride solution was added to a solution of 1.2 grams of 1-phenyl-2,5-diketo-7-methylpyrimidopyrazole in 10 cc. of methanol followed by 9 cc. of sodium hydroxide solution (6 N). The reaction mixture which separated, was filtered and washed with water to yield the azo dye. An alcoholic solution of this dye is yellow.

When the 1-phenyl-2,5-diketo-7-methylpyrimidopyrazole is coupled with diazotized sulfanilic acid, an alkali-soluble yellow dyestuff is obtained.

EXAMPLE II 1-(p-tolyl)-2,5-diketo-3-(p-methylphenylazo)-7-methylpyrimidopyrazole

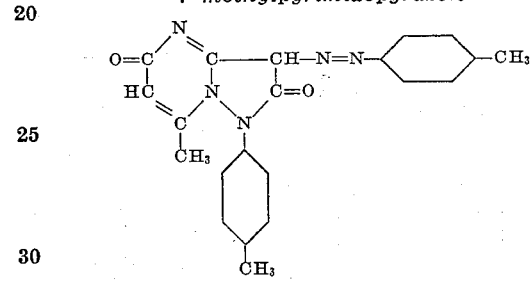

A mixture of 0.6 gram of p-toluidine, 10 cc. of water, 20 grams of ice, and 5 cc. of hydrochloric acid (6 N) was diazotized with a solution of 0.4 gram of sodium nitrite in 5 cc of water. The resulting diazonium salt solution was added to a solution of 1.4 grams of 1-(p-tolyl)-2,5-diketo-7-methylpyrimidopyrazole in 30 cc. of methanol. After the addition of 8 cc. of sodium hydroxide (6 N), the reaction mixture separated out. The dyestuff dissolves in organic solvents such as ethyl alcohol to yield a yellow solution.

EXAMPLE III 1-(α-quinolyl)-2,5-diketo-3-(6-ethoxybenzothiazole-2-azo)-7-methylpyrimidopyrazole

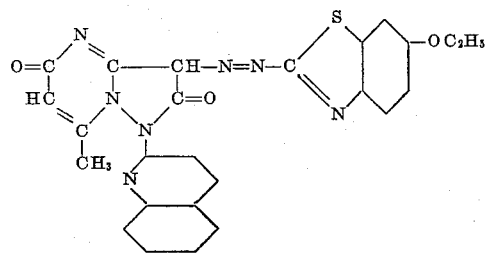

A mixture of 1.9 grams of 2-amino-6-ethoxybenzothiazole, 50 cc. of water, 50 grams of ice, and 15 cc. of hydrochloric acid (6 N) was diazotized with a solution of 0.7 gram of sodium nitrite in 5 cc. of water. The resulting diazonium salt solution was added to a solution of 3.1 grams of 1-(α-quinolyl)-2,5-diketo-7-methylpyrimidopyrazole in 50 cc. of methanol followed by 8 cc. of sodium hydroxide (6 N). The resulting mixture became orange in color and the product was filtered, washed with water, and purified by recrystallization from methanol.

EXAMPLE IV

*p,p'-Bis(3-azo-1,7-dimethyl-2,5-diketopyrimidopyrazole)-stilbene*

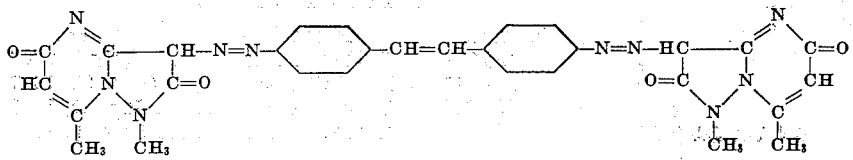

A mixture of 1.2 grams of 4,4'-diamino stilbene, 25 cc. of water, 30 grams of ice, and 10 cc. of hydrochloric acid (6 N) was diazotized with a solution of 0.7 gram of sodium nitrite in 5 cc. of water. The resulting diazonium salt solution was added to a solution of 1.0 gram of 1,7-dimethyl-2,5-diketopyrimidopyrazole in 40 cc. of methanol followed by 10 cc. of sodium hydroxide (6 N). The resulting mixture became deep orange in color and the product was filtered, washed with water, and purified by recrystallization from methanol.

EXAMPLE V

*1-methyl-2,5-diketo-3-(o-methoxyphenylazo)-7-methylpyrimidopyrazole*

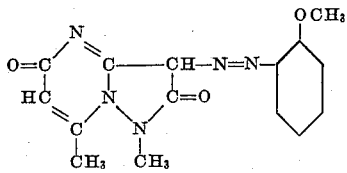

Example I was repeated with the exception that 1 gram of 1-methyl-2,5-diketo-7-methylpyrimidopyrazole was substituted for 1.2 grams of 1-phenyl-2,5-diketo-7-methylpyrimidopyrazole. An alcoholic solution of this dye is yellow.

The azo compounds of the present invention are useful in many photographic applications. The dyes, both water-soluble and water-insoluble, may be used in the silver dye bleach process of color photography wherein dye images are formed by the selective destruction of the dyes in the presence of silver images. They may also be used as filter and anti-halation dyes in light-sensitive photographic film.

The azo compounds, since they contain an azo substituent in the reactive coupling position of the pyrimidopyrazole nucleus, will react in color forming development with the oxidation product of the developer in the usual manner to form colored images. The azo group of the pyrimidopyrazoles is displaced by the aryl-amino group during dye image formation.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claims.

I claim:

1. Azo dyestuffs having the general formula:

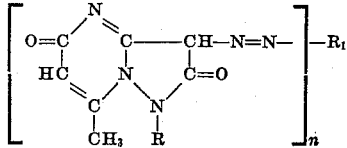

wherein R is selected from the class consisting of alkyl of not more than 18 carbon atoms, aryl of the benzene, naphthalene, and diphenylene series, aralkyl of the benzene series, and mono-unsubstituted nitrogenous heterocyclic group selected from the class consisting of benzothiazolyl, $\alpha$-quinolyl, and $\alpha$-pyridyl, $R_1$ represents the radical of a diazotizable amine and n is a numeral ranging from 1 to 2.

2. The azo dye having the formula:

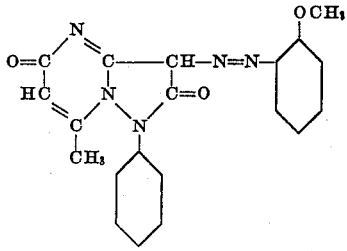

3. The azo dye having the formula:

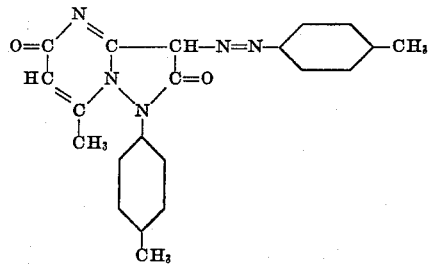

4. The azo dye having the formula:

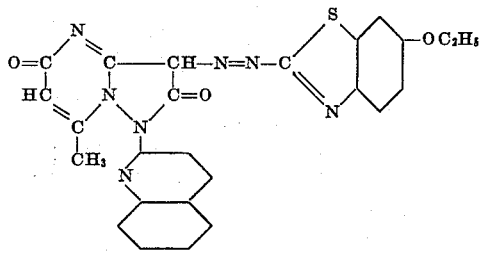

5. The azo dye having the formula:

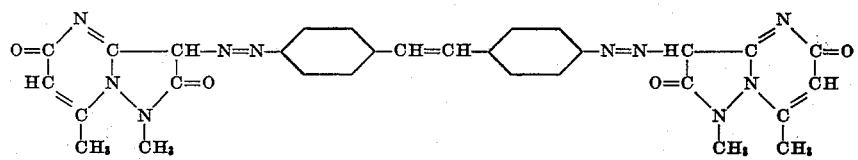

6. The azo dye having the formula:
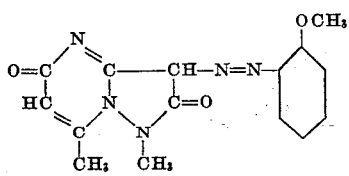
HENRY B. KELLOG.
REFERENCES CITED
The following references are of record in the file of this patent:
UNITED STATES PATENTS
| Number | Name | Date |
|---|---|---|
| 2,403,329 | Bavley | July 2, 1946 |
| 2,427,911 | Kendall et al. | Sept. 23, 1947 |
| 2,459,226 | Kendall et al. | Jan. 18, 1949 |
| 2,481,466 | Bavley | Sept. 6, 1949 |